US008961101B2

(12) United States Patent
Jeffus

(10) Patent No.: US 8,961,101 B2
(45) Date of Patent: Feb. 24, 2015

(54) WIND TURBINE SPEED MAINTENANCE SYSTEM

(76) Inventor: Larry Jeffus, Elkhart, KS (US)

(*) Notice: Subject to any disclaimer, the term of this patent is extended or adjusted under 35 U.S.C. 154(b) by 616 days.

(21) Appl. No.: 13/298,362

(22) Filed: Nov. 17, 2011

(65) Prior Publication Data

US 2012/0128489 A1 May 24, 2012

Related U.S. Application Data

(60) Provisional application No. 61/415,133, filed on Nov. 18, 2010.

(51) Int. Cl.
*F03D 7/02* (2006.01)
*F03D 9/02* (2006.01)

(52) U.S. Cl.
CPC ............. *F03D 9/028* (2013.01); *F05B 2260/42* (2013.01); *Y02E 10/72* (2013.01); *Y02E 60/15* (2013.01)
USPC ................................................ 415/1; 415/82

(58) Field of Classification Search
CPC ..... F03D 1/0675; F03D 7/022; F03D 7/0244; F03D 7/0256; F03D 7/0276; F05B 2270/101; F05B 2270/1011; F05B 2270/1012; F05B 2270/1014; F05B 2270/1016; B64C 27/18; B64C 27/475; B64C 2027/725; B64C 2027/8245; B64C 27/473

USPC .................. 415/80, 81, 82; 416/93 R
See application file for complete search history.

(56) References Cited

U.S. PATENT DOCUMENTS

| | | | | |
|---|---|---|---|---|
| 4,206,608 A * | 6/1980 | Bell | ................................ | 60/698 |
| 4,366,973 A * | 1/1983 | Brekke | ......................... | 285/276 |
| 6,492,743 B1 | 12/2002 | Appa | | |
| 6,940,185 B2 * | 9/2005 | Andersen et al. | ................ | 290/44 |
| 7,254,944 B1 * | 8/2007 | Goetzinger et al. | ............. | 60/398 |
| 7,435,057 B2 * | 10/2008 | Parera | ........................ | 416/231 R |
| 2008/0050234 A1 * | 2/2008 | Ingersoll et al. | ........... | 416/132 B |
| 2008/0317598 A1 * | 12/2008 | Barbu et al. | ......................... | 416/9 |
| 2010/0014970 A1 * | 1/2010 | Bove et al. | ......................... | 416/1 |
| 2010/0080683 A1 | 4/2010 | Presz, Jr. et al. | | |
| 2010/0107621 A1 | 5/2010 | Garvey | | |
| 2011/0233934 A1 | 9/2011 | Crane et al. | | |

* cited by examiner

*Primary Examiner* — Edward Look
*Assistant Examiner* — Jason Davis
(74) *Attorney, Agent, or Firm* — Hall Estill Attorneys at Law; Tyler J. Mantooth

(57) ABSTRACT

A system of operating a wind turbine that is capable of extending electricity production, such as in low and high wind speed environments. In accordance with various embodiments, a wind turbine speed maintenance system has a wind turbine with at least one turbine blade that has a trailing edge with a speed feature. The speed feature is connected to a controller and a pressure vessel, the controller selectively activating the speed feature in response to the turbine blade reaching a predetermined radial velocity.

20 Claims, 5 Drawing Sheets

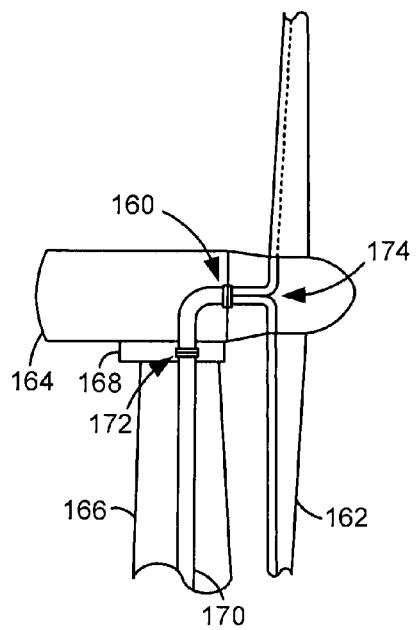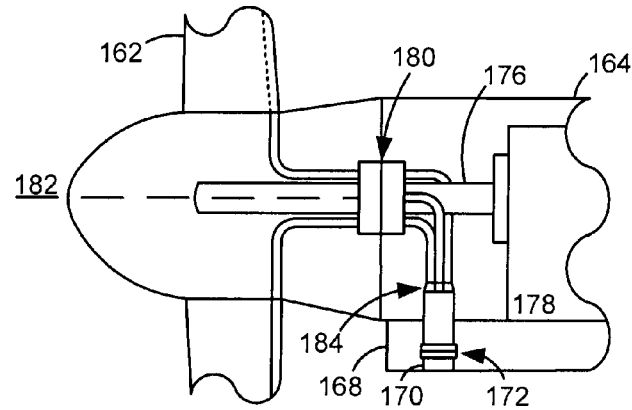
FIG. 4  FIG. 5
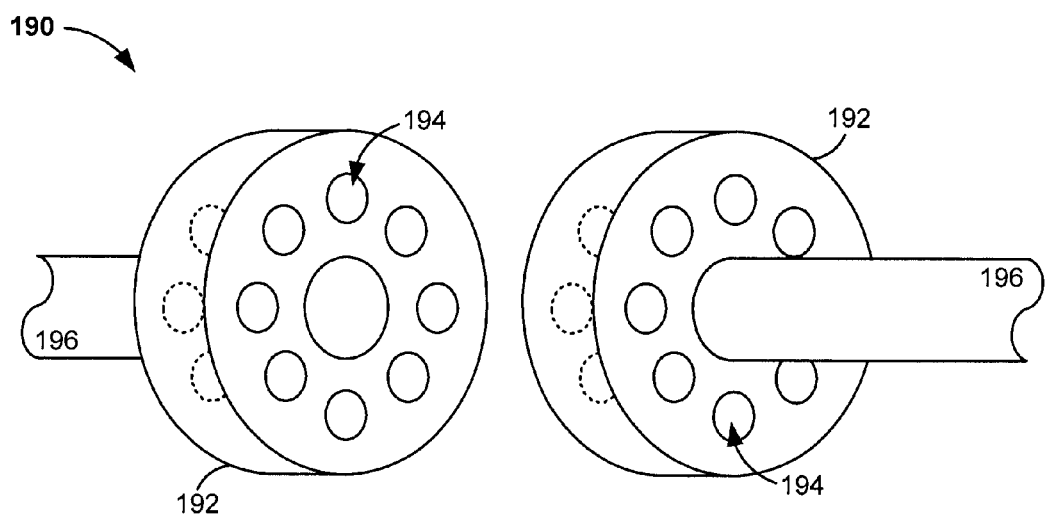
FIG. 6

WIND TURBINE SPEED MAINTENANCE SYSTEM

RELATED APPLICATION

The present application makes a claim of domestic priority to U.S. Provisional Patent Application No. 61/415,133 filed Nov. 18, 2010.

FIELD OF THE INVENTION

The present invention is generally directed to alternative forms of electricity generation, such as wind driven turbines.

SUMMARY OF THE INVENTION

In accordance with various embodiments, a wind turbine speed maintenance system has a wind turbine with at least one turbine blade that has a trailing edge with a speed feature. The speed feature is connected to a controller and a pressure vessel, the controller selectively activating the speed feature in response to the turbine blade reaching a predetermined radial velocity.

These and other features and advantages which characterize the various embodiments of the present invention can be understood in view of the following detailed discussion and the accompanying drawings.

BRIEF DESCRIPTION OF THE DRAWINGS

FIG. 4 displays an interior view of a portion of an exemplary wind turbine.

FIG. 5 illustrates an interior view of a portion of an exemplary wind turbine.

FIG. 6 presents an exemplary rotation feature as constructed and operated in accordance with various embodiments of the present invention.

DETAILED DESCRIPTION

The present disclosure generally relates to maintaining a radial velocity of a wind turbine blade by activating a speed feature. Added emphasis has been placed on alternative "green" energy production, which consequently results in greater reliance on renewable forms of electricity, such as wind, solar, and geothermal energy. In some geographic regions, wind energy is an abundant resource that can potentially produce a substantial amount of electricity. However, wind turbines can be restricted to producing electricity while rotating within a certain radial velocity range. Thus, wind turbines can have limited electricity production efficiency despite the presence of enough wind to rotate the turbine.

Accordingly, various embodiments of the present invention are generally directed to a system for maintaining the speed of a wind turbine within an operating radial velocity range by selectively activating a speed feature. A controller can sense that the wind turbine is about to exit the operating radial velocity range and activate the speed feature by selecting a pressure vessel to distribute compressed gas to the speed feature. Such selective activation of the speed feature allows the turbine to increase or decrease radial velocity based on if the wind turbine is within the operating radial velocity range.

Figure 1:
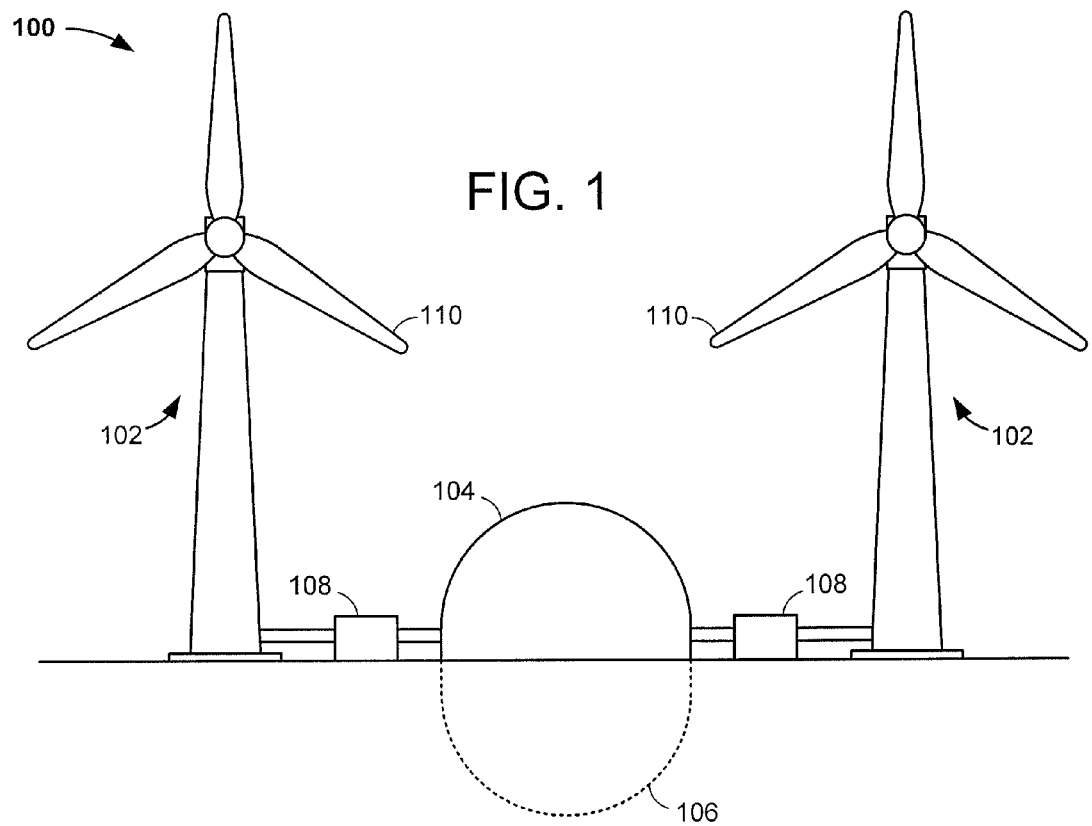
FIG. 1 generally provides an exemplary array of wind turbines capable of utilizing a speed maintenance system.

FIG. 1 provides an exemplary wind turbine array 100 that is capable of utilizing wind to produce electricity. The array 100 has a number of wind turbines 102 that can each, either individually or in combination, translate wind to radial velocity and electricity through a generator. It should be noted that the array 100 is provided to show an exemplary environment in which various embodiments of the present invention can be advantageously practiced. It will be understood, however, that the claimed invention is not so limited.

The array 100, as shown, includes a substantially sealed pressure vessel 104 connected to each wind turbine 102 and plumbed to be able to selectively provide the pressurized contents of the pressure vessel 104 to one, or more, wind turbines 102. In some embodiments, the pressure vessel 102 is a shaped object, such as a sphere or a cylinder, which holds pressurized air at a predetermined pressure. In other embodiments, the pressure vessel 106 can be an artificial or natural underground chamber that can maintain air at the predetermined pressure.

While the size, shape, and material construction of a pressure vessel 104 is not limited to a certain configuration, portability and durability of a pressure vessel 104 can be enhanced by including an internal bladder capable of absorbing external trauma, such as polyvinyl cloth and rubber. Such an internal bladder can provide beneficial weight to strength ratio that provides both portability and durability during various operational environments encountered in nature. An internal bladder may also be used in conjunction with an underground pressure vessel 106, such as a cave, rock formation, and reservoir, whether or not the pressure vessel 106 is substantially sealed.

The pressure vessels 104 and 106 can each be filled and maintained at a predetermined pressure by at least one compressor 108. The size and number of compressors is not limited in the array, but as shown, each wind turbine 102 has a corresponding compressor 108 that feeds one or more pressure vessels 104 and 106. The compressors 108, in some embodiments, are operated directly by the electricity generated by the wind turbines 102. That is, the compressors 108 may have an electrical configuration that allows the energy being generated by the wind turbines 102 to operate the compressors 108 without the generated electricity being conditioned by an off-site substation, electrical plant, and electrical grid.

With compressed air being stored in one or more pressure vessels 104 and 106, the energy within the pressurized vessel can be harnessed by one, or both, wind turbines 102 to increase or decrease the radial velocity of the turbine blades 110 to maintain desired radial velocity, or velocity range. The ability to maintain the turbine blades 110 within a velocity range can provide added electrical energy production due to extended turbine 102 operating time in the presence of reduced, or inflated, wind speeds.

Figure 2:
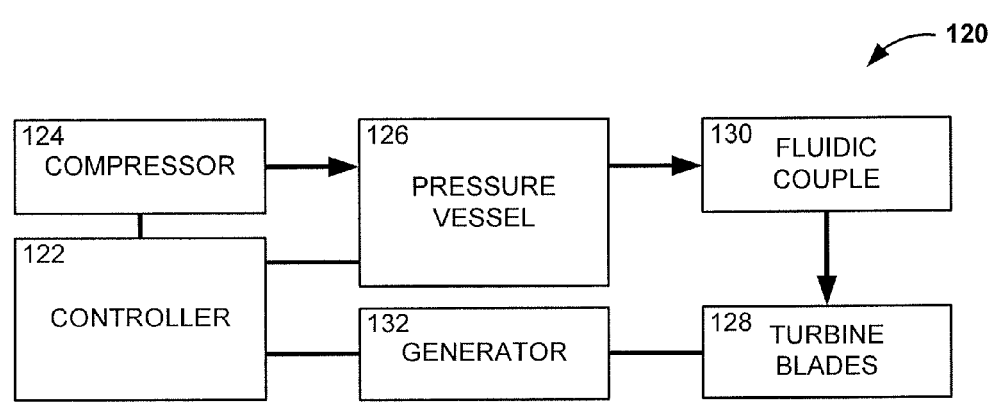
FIG. 2 is a block representation of a wind turbine speed maintenance system.

FIG. 2 provides an exemplary block representation of a wind turbine maintenance system 120 that can be conducted in conjunction with the array 100 of FIG. 1. The system 120 has a controller 122 that is connected to a compressor 124 and pressure vessel 126. The controller 122 can have one or more sensors and operating software that allows for the sensing of at least wind speed, wind turbine radial velocity, pressure vessel pressure, and wind turbine electrical energy output.

With the various data collected and processed by the controller 122, the compressor 124 and pressure vessel 126 can be selectively activated to provide the trailing edge of the wind turbine blade 128 with velocity altering compressed air through a fluidic coupling 130. That is, the controller 122 can activate a speed feature on the wind turbine blades 128 with compressed air from the pressure vessel 126, which reaches the rotating turbine blades 128 by way of a fluidic coupling 130 to generate electricity with a generator 132.

The controller 122 can further monitor the pressure vessel 126 and electrical generation output of the generator 132 to selectively activate the compressor 124 during selected operating windows, such as during peak wind turbine generation. By activating the compressors 124 during the selected operating windows, the pressure vessel 126 can be maintained at the predetermined pressure as efficiently as possible. In other words, electricity generated by the wind turbine generator 132 in the predetermined operating window can be siphoned to operate the compressors to supply and maintain the pressure vessel 126 at the predetermined pressure, as opposed to powering the compressor 124 with power from an external electric grid.

Hence, the selective utilization of the electricity generated by a wind turbine allows for complete or partially self-contained power generation of compressed air that is then used to elongate the operating windows of the wind turbine to generate more electricity. In such a way, the compression and storage of air in the pressure vessel 126 is a different manner of storing wind energy, as opposed to electrical storage.

Figure 3A:
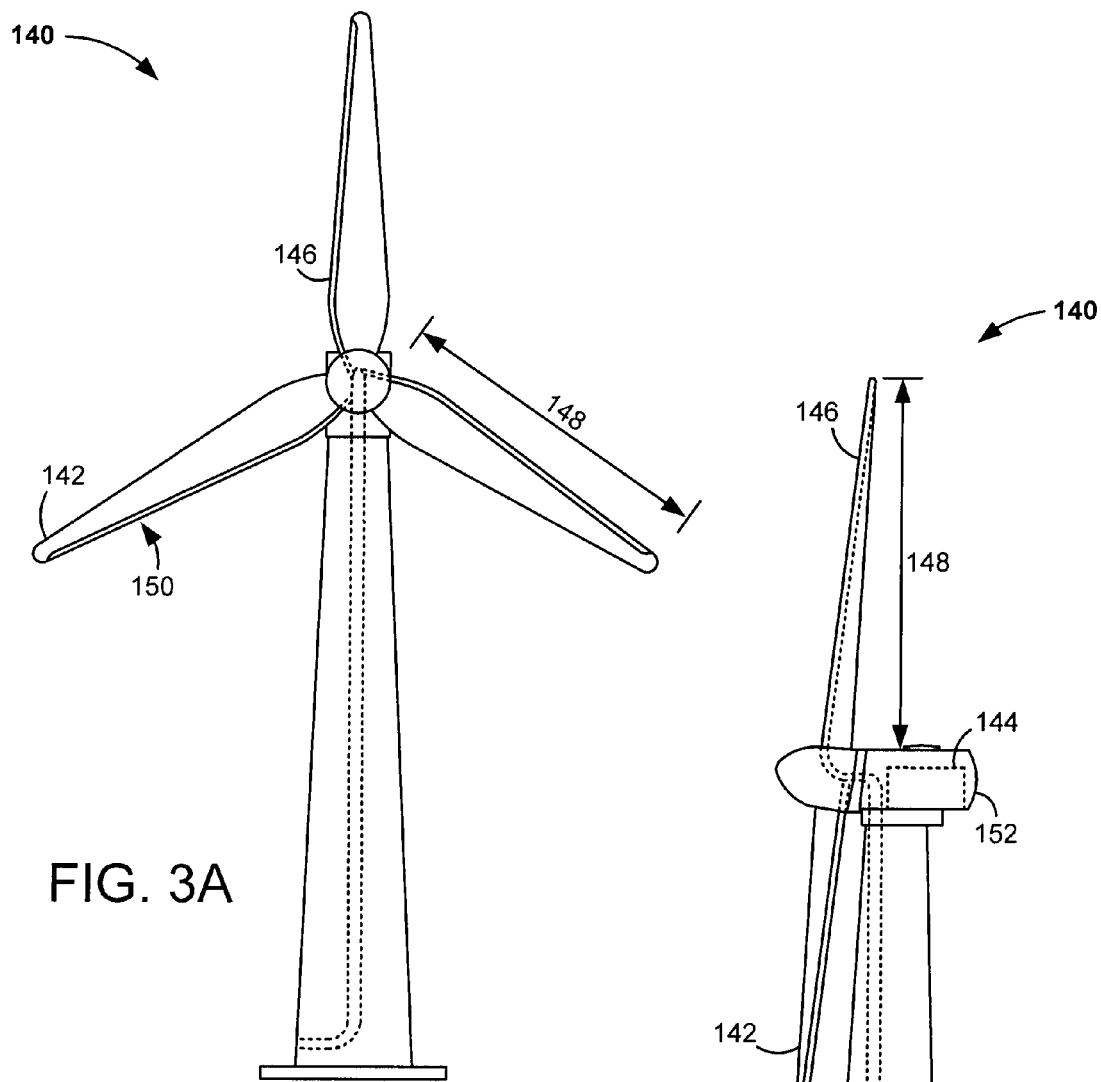
FIGS. 3A and 3B display front and side views of an exemplary wind turbine capable of being used in the speed maintenance system of FIG. 2.
Figure 3B:
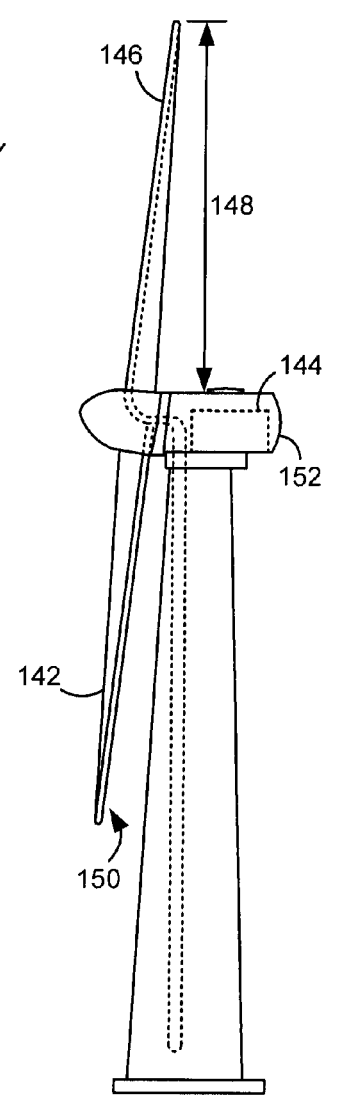

FIGS. 3A and 3B respectively display front and side views of an exemplary wind turbine 140 that can be incorporated into the system 120 of FIG. 2. The wind turbine 140 has a multitude of wind turbine blades 142 that rotate to generate electricity through connection with a generator 144. While not limited, some embodiments configure each wind turbine blade 142 has a speed feature 146 that extends substantially along the length 148 of the trailing edge 150. The speed feature 146 is not restricted to a particular configuration, but can be designed to distribute compressed air from a pressure vessel, such as vessel 104 of FIG. 1, substantially uniformly along predetermined portions, such as the entire length 148, of the trailing edge 150.

In various embodiments, the speed feature 146 has different lengths and pressure release mechanisms for the different wind turbine blades 142. As such, the configuration of the speed feature 146 is not limited to a particular design and can be constructed to accommodate a number of different operating characteristics that alter the radial velocity of the turbine blades 142 to generate electricity for an extended amount of time. For example, solenoid driven directional nozzles and stationary jets can be used individually or in combination as pressure release mechanisms that alter the radial velocity of a turbine blade 142.

The variable and often unpredictable nature of wind can correspond with wind turbine 140 rotating features that tilt and maneuver the nacelle 152 and blades 142 into an optimal position to utilize the wind to generate electricity. However, the plumbing of compressed air to the trailing edge 150 of each blade 142 can pose difficulties in relation to the rotating capability of the wind turbine 140. FIGS. 4 and 5 each generally illustrate piping rotating features 160 and 180 that allow for the distribution of compressed air while the turbine blades 162 and nacelle 164 tilt and rotate.

In FIG. 4, the nacelle 164 is attached to a tower 166 via a laterally pivoting bearing 168 that allows the nacelle 164 to have rotational movement capability. The sealed piping 170 from a pressure vessel can translate compressed air through the pivot bearing 168 with a pivot feature 172 that restricts air pressure drop and leaks while the nacelle 164 is either stationary or in motion. The sealed piping 170 further is translated to the rotating wind turbine blades 162 by the rotating feature 160. While not required or limited, the rotating feature 160 can divide the single sealed piping inlet into a number of outlet pipes 174 that each correspond with one or more turbine blades 162.

The ability to plumb the compressed air through the internal cavity of the tower 166, nacelle 164, and turbine blades 162 provides protection of the sealed piping 170 from the environment, such as sun and snow, while providing minimal pressure loss due to piping length and connections. The configuration of the rotating feature 160 with the single inlet and multiple outlets allows for the combination of transmitting compressed air through the rotating plane of the turbine blades 162 and the separation of the piping into tributary pipes that send air to each blade 162, which provides for compressed air pressure maintenance with a single rotating feature 160.

Turning to FIG. 5, the sealed piping 170 transfers into the nacelle 164 through the pivot bearing 168 with a pivot feature 172 while the rotating feature 180 translates the piping 170 to the turbine blades 162. The configuration of the rotating feature 180 allows the sealed piping 170 to be directed around a turbine shaft 176 that drives a generator 178, which revolves about the central rotating axis 182 of the turbine blades 162. The presence of the turbine shaft 176 occupying the rotational center of the turbine blade 162 and make the rotating feature 180 difficult to implement. However, the rotating feature 180 is constructed to have the turbine shaft 176 disposed within the feature 180 while providing a sealed conduit for the compressed air through the rotating plane of the turbine blades 162.

In response to the turbine shaft 176 being positioned in the center of the rotating feature 180, the sealed piping 170 is split into smaller tributary pipes by a dividing feature 184. The reduced diameter tributary pipes can then be manipulated around the turbine shaft 176 to input into the rotating feature 180 and subsequently track to the turbine blades 162. As such, the rotating feature 180 can transfer compressed air through to a rotating turbine blade 162 without interfering with the turbine shaft 176 or plumbing the sealed piping 170 outside the nacelle 164.

FIG. 6 shows an exploded view of an exemplary rotating feature 190 that can be used to translate compressed air to rotating turbine blades, as generally illustrated in FIGS. 5 and 6. The feature 190 has two contactingly adjacent flanges 192 that can independently rotate. Each flange 192 can have any number of distribution apertures 194 that align with some or all the apertures of the opposing flange 192. With the alignment of the distribution apertures 194, rotation of one or both flanges 192 provides channels through both flanges 192 so that fluid, such as compressed air, can travel.

In operation, the rotation of the flanges 192 opens and closes the channels, which creates a high and low pressure region on opposing sides of the rotating feature 190. Such differential pressure regions provide an added amount of propulsion to transfer the fluid through the channels from one side of the feature 190 to the other. While not required or limited, the rotating feature 190 can be configured with a central bore that houses, with or without contact, a shaft 196, such as the rotating turbine shaft 176 of FIG. 5.

The non-limited construction of the rotating feature 190 of FIG. 6 provides an ability to configure the rotating feature 190 with a number of different apertures 194 of different sizes and orientations to accommodate various operating conditions through a variety of operating characteristics, such as pressure drop and rotating speeds. An exemplary feature construction separates the flanges 192 into multiple pieces that can more easily be retro-fitted about existing wind turbine components without disassembling some of the wind turbine.

It should be noted that the rotating feature 190 of FIG. 6 is not exhaustive and is expected to include a number of additional components, none of which are required or limited. Such additional components can include at least rotational bearings and seals that ensure minimal fluid leakage and rotational drag during stationary and rotating operation.

Figure 7A:
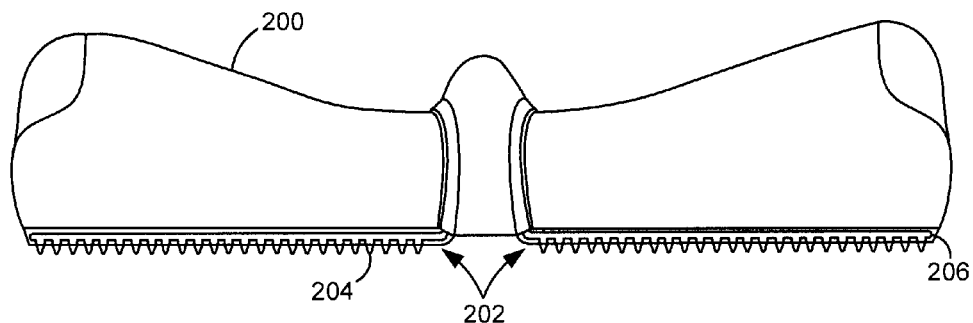
FIG. 7 shows a portion of a wind turbine blade configured with a speed feature in accordance with various embodiments of the present invention.
Figure 7B:
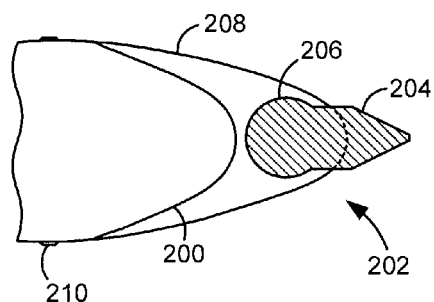

FIGS. 7A and 7B generally illustrate an exemplary wind turbine blade 200 that is configured with speed features 202 that can eject compressed fluid to alter the radial velocity of the turbine blade 200. The speed features 202, as shown in FIG. 7A, each have a number of nozzles 204 that extend from a distribution pipe 206 to a position outside the turbine blade 200. The external position of the nozzles 204 allows for the propulsion or impeding of radial movement of the turbine blade 200 without damage to the blade itself.

In some embodiments, the speed feature 202 is positioned along the trailing edge of the turbine blade 202 to provide maximum energy distribution with minimal drag on the turbine blade 200. The configuration of the speed feature 202 can be altered to have an increased compressed fluid ejection near the distal end of the turbine blade 200 to capitalize on the leverage provided by the length of the blade 200. That is, the speed feature 202 can be constructed with any length to occupy some or all of the blade 200, such as near the tip of the turbine blade 200, to generate radial energy that is increased by the length of the turbine blade 200 from tip to radial axis, such as radial axis 182 of FIG. 5.

FIG. 7B displays an exemplary cross-section of the speed feature 202 of FIG. 7A. While not required or limited, the speed feature 202 can be attached externally to the wind turbine blade 200 and implemented into the aerodynamic design of the blade 200 by surrounding at least the distribution pipe 206 with a drag feature 208 that reduces the drag of the distribution pipe 206. The construction of the drag feature 208 can take a number of different sizes, shapes, and materials that are attached to the wind turbine blade 200 with a variety of attachment features 210 in the form of fasteners and glues, without limitation.

The ability to mount the speed feature 202 on the outside of a wind turbine blade 200 allows for the retro-fitting of existing wind turbines with radial velocity altering speed features 202, which can increase the productivity of existing wind powered electricity generation. However, in some wind turbine blades 200, such as new construction blades, speed features 202 can be incorporated into the blade 200 without the need for drag 208 and attachment 210 features. Regardless of how the speed feature 202 is connected to the turbine blade 200, the selective activation of the speed feature 200 allows for modification of the radial velocity of the blade 200 through expulsion of compressed air.

In an exemplary operational embodiment, as the wind turbine blade 200 encounters a wind speed that is near or outside the predetermined operating window, one or multiple nozzles 204 can be selected to eject compressed fluid to slow down or speed up the blade 200 and maintain the radial velocity of the blade 200 within the operating window. The alteration of blade speed can be done with various unlimited speed feature configurations. One such configuration is the combination of stationary and directional nozzles 204 that each are connected to separated and dedicated distribution pipes 206, which allows for added control of the compressed fluid and the radial velocity of the turbine blade 200.

The variety of speed feature 202 configurations and retro-fit applications can provide vast practical application for the expulsion of compressed air from wind turbine blades 200. The various configurations of the speed features can be coupled with various pressure vessels that provide enhanced compressed air supply. The unlimited configurations of the speed feature can be combined with any number of couplings, controls, piping, generators, and pressure vessels to accommodate a variety of retro-fit applications.

For example, a portion of the rotating feature, piping, and speed feature may be externally mounted from the nacelle and turbine blade 200 to allow installation and operation of the speed feature 202 without disassembling the wind turbine or wind turbine blade 200. In one such embodiment, the rotating features of FIGS. 4-6 can be mounted on the outside of the nacelle and blade assembly so that the feature rotates with the blades and is exposed to natural elements, such as rain and snow, but can be readily retro-fitted onto any wind turbine without the removal of the blade assembly from the nacelle.

It is contemplated that aerodynamic features, similar to the drag feature 208 of FIG. 7B, can provide protection from natural elements while allowing minimal invasive assembly that requires heavy machinery, such as cranes, to manipulate the various components of the wind turbine. Likewise, the sealed piping can be mounted external to the wind turbine tower, nacelle, and blade assembly to reduce or eliminate the need to dismantle or run piping through the various components of the wind turbine.

Figure 8:
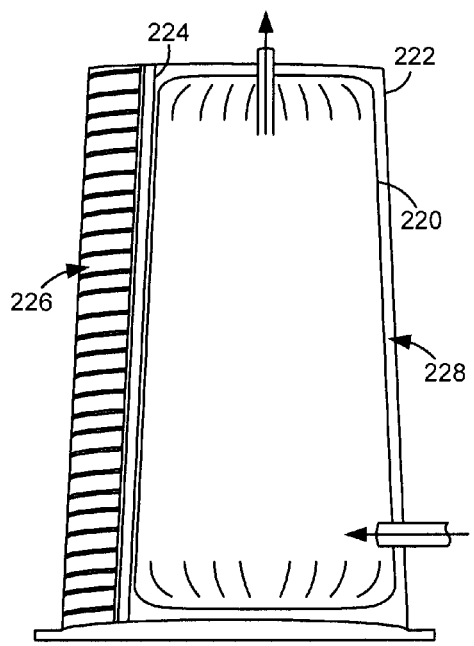
FIG. 8 displays an interior view of an exemplary wind turbine tower.

An exemplary pressure vessel 220, either alone or in combination, that can enhance compressed air supply is generally illustrated in FIG. 8. Pressure vessel 220 is incorporated into an internal cavity of a wind turbine tower 222, which protects the vessel 220 from environmental and natural trauma. The pressure vessel 220, as shown in FIG. 8, is constructed adjacent a bulkhead 224 that separates a service region 226, such as a service ladder, from a sealed chamber 228. The presence of the bulkhead 224 allow for the implementation of a pressure vessel 220 in the form of either a self-contained bladder or a pair of seals that utilize the bulkhead 224 as a portion of the pressure vessel 220. In other words, the pressure vessel 220 can be constructed externally and inflated in the wind turbine tower 222 or internally with seals that enclose a portion of the sealed chamber 228 of the tower 222.

The operation of the pressure vessel 220, regardless of form, size, and material, can be used alone or in combination with other pressure vessels, such as the centralized pressure vessel 104 of FIG. 1, to provide a predetermined volume and pressure of compressed air to various speed features. Similarly, a number of compressors can be used to supply and maintain air at a predetermined pressure in the pressure vessel 220. Hence, a primary compressed air supply chain that has a centralized pressure vessel can be supplemented with a secondary compressed air supply in the form of pressure vessels 220 incorporated into each wind turbine.

While the configurations of the speed features, wind turbines, and pressure vessels can vary, the operation of altering the radial velocity of the wind turbine blades with compressed air is determined by preset operating parameters. Exemplary preset operating parameters are generally presented in the wind turbine speed maintenance routine 230 in FIG. 9.

Figure 9:
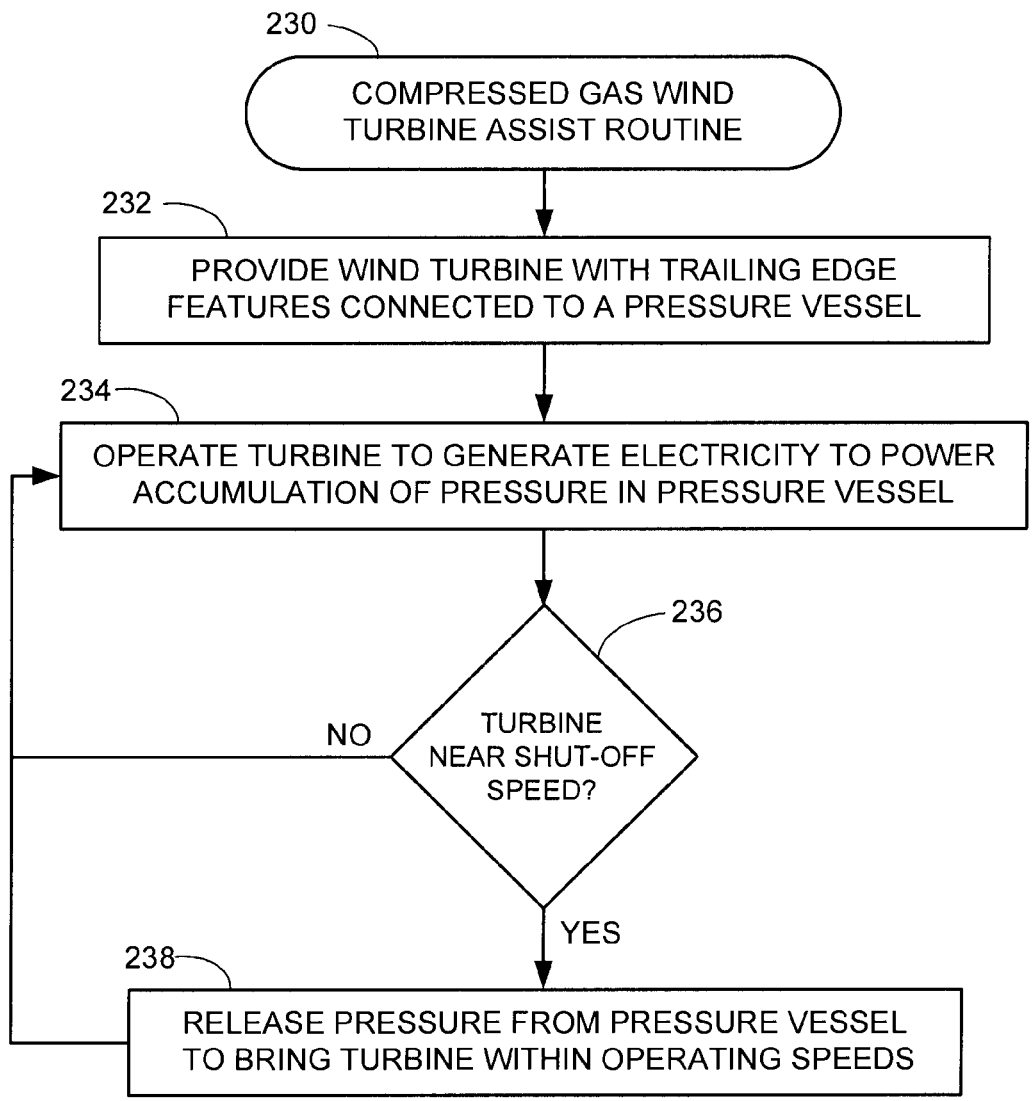
FIG. 9 provides a flowchart of an exemplary wind turbine speed maintenance routine conducted in accordance with various embodiments of the present invention.

The routine 230 of FIG. 9 initially provides at least one wind turbine in step 232 with a speed feature connected to a pressure vessel and controlled by a controller. As discussed above, the speed feature can be formed on the trailing edge of one, or many, blades of the wind turbine. Step 234 proceeds to operate the wind turbine to generate electricity that is siphoned by at least one compressor that fills and maintains the provided pressure vessel at a particular pressure. With the pressure vessel having a predetermined usable volume of compressed air, the wind turbine can operate within a range of radial velocities to produce electricity as decision 236 continually, or periodically, determines if the turbine is near shut-off speed.

The wind turbine may produce electricity without encountering a shut-off speed, either too fast or slow, which leads the routine 230 from decision 236 to step 234 in a continuous loop. As the wind turbine blades reach the bounds of the operating range of radial velocities, decision 236 triggers the release of pressure from the provided pressure vessels through activation of one or more speed features on the wind turbine blades in step 238.

It can be appreciated that the configuration and material characteristics of the various components of the wind turbine speed maintenance system allows for extended electricity generation through radial velocity modification. The utilization of compressed air from a pressure vessel provides immediate energy to a speed feature that then modifies the turbine blade speed, as desired. The various retrofit and new construction design capabilities of the present speed maintenance system, including the rotating features that transfer compressed air to moving turbine blades, allows functional alternatives that allow for implementation in a vast variety of operational and environmental situations. In addition, while the embodiments have been directed to wind turbine electricity generation, it will be appreciated that the claimed invention can readily be utilized in any number of other applications.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A system comprising:
at least one wind turbine with at least one turbine blade having a speed feature;
a pipe connecting the speed feature to a tower via a rotating fluidic feature; and
a controller connected to the speed feature, the controller configured to selectively activate the speed feature by passing compressed fluids from the tower to the turbine blade to modify a preexisting radial velocity of the at least one turbine blade.

2. The system of claim 1, wherein the speed feature is a plurality of nozzles extending from a trailing edge of the at least one turbine blade.

3. The system of claim 2, wherein at least one of the plurality of nozzles is capable of rotating in response to the controller to eject compressed fluids from a variety of angular orientations.

4. The system of claim 2, wherein the plurality of nozzles are concentrated at a turbine tip of the at least one turbine blade, the turbine tip being the greatest distance from a rotational axis of the at least one turbine blade.

5. The system of claim 2, wherein the plurality of nozzles are spread across a majority of the trailing edge of the at least one turbine blade.

6. The system of claim 2, wherein at least one of the plurality of nozzles is confined within a drag feature attached to a trailing edge of the at least one turbine blade.

7. The system of claim 1, wherein the controller is connected to at least one pressure vessel and at least one fluid compressor, the controller capable of selectively activating the at least one pressure vessel and at least one fluid compressor to pressurize the at least one pressure vessel and eject compressed fluids.

8. The system of claim 7, wherein the at least one pressure vessel is wholly enclosed within a portion of the at least one wind turbine.

9. The system of claim 7, wherein the at least one pressure vessel is positioned underground.

10. The system of claim 7, wherein at least two separate rotating fluidic couples transmit compressed fluid from the at least one pressure vessel to the speed feature.

11. A method comprising:
providing at least one wind turbine with at least one turbine blade having a speed feature connected to a controller; and
connecting the speed feature to a tower with a pipe continuously extending from the tower to the at least one turbine blade via a rotating fluidic feature;
selectively activating the speed feature with the controller by passing compressed fluids from the tower to the at least one turbine blade; and
ejecting compressed fluids from the turbine blade to modify a preexisting radial velocity of the at least one turbine blade.

12. The method of claim 11, further comprising determining a peak electrical generation by the at least one wind turbine and directing power from the at least one wind turbine to a compressor to pressurize at least one pressure vessel.

13. The method of claim 12, wherein the compressor operates exclusively off electricity generated by the at least one wind turbine.

14. The method of claim 12, wherein the compressor is operated by the controller during an off peak electrical generation time for the at least one wind turbine to maintain a predetermined pressure in the pressure vessel.

15. The method of claim 11, wherein the ejected compressed fluids are directed by the speed feature in a direction that reduces the radial velocity of the at least one turbine blade.

16. The method of claim 11, wherein the ejected compressed fluids are directed by the speed feature in a direction that increases the radial velocity of the at least one turbine blade.

17. The method of claim 11, wherein ejecting compressed fluids extends the electricity generation capability of the at least one wind turbine.

18. A wind turbine array comprising:
a plurality of wind turbines each with at least one turbine blade having a speed feature, the speed feature;
at least one pressure vessel fluidly connected to one or more speed features via at least one pipe extending from the at least one pressure vessel through a tower, the pipe passing from the tower to the at least one turbine blade via a rotating fluidic feature, the rotating fluidic feature comprising first and second flanges each having a plurality of apertures configured to open and close in response to rotation of the first flange in relation to the second flange;

a compressor connected to the at least one pressure vessel; and a controller connected to the speed feature, pressure vessel, and compressor, the controller configured to pass compressed fluids from the at least one pressure vessel to the speed feature via the at least one pipe to modify a radial velocity of the at least one turbine blade in response to the at least one turbine blade reaching a predetermined radial velocity.

19. The wind turbine array of claim 18, wherein each turbine blade of each wind turbine has a speed feature capable of selectively reducing and increasing radial velocity of the turbine blades.

20. The wind turbine array of claim 18, wherein a first turbine blade is maintained at a first radial velocity by ejecting compressed fluids from a first speed feature and a second turbine blade is maintained at a second radial velocity by ejecting compressed fluids from a second speed feature.

\* \* \* \* \*